(No Model.)
W. J. MARSHALL.
DRESS CHART.
No. 535,843. Patented Mar. 19, 1895.
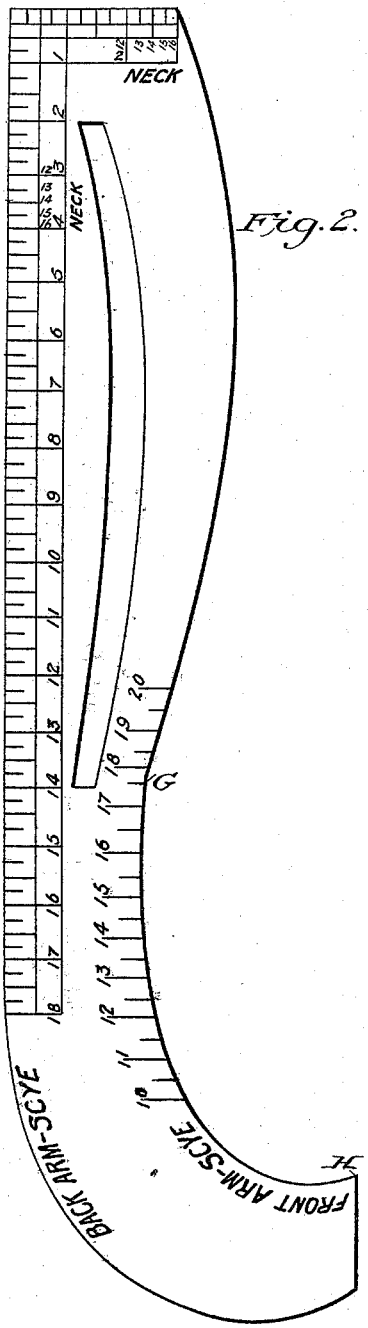
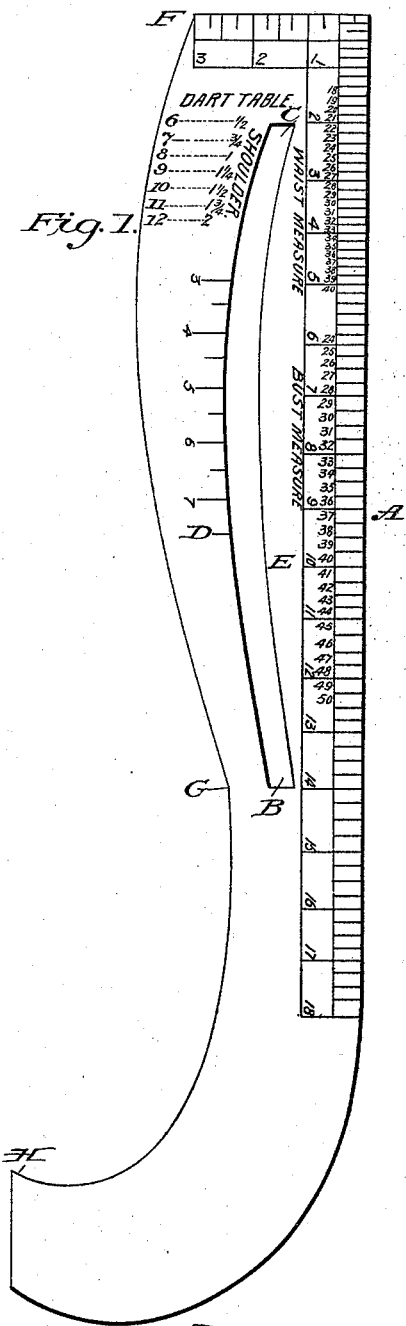

UNITED STATES PATENT OFFICE.

WILLIAM J. MARSHALL, OF MINNEAPOLIS, MINNESOTA.

DRESS-CHART.

SPECIFICATION forming part of Letters Patent No. 535,843, dated March 19, 1895.

Application filed February 18, 1893. Serial No. 462,877. (No model.)

*To all whom it may concern:*

Be it known that I, WILLIAM J. MARSHALL, a citizen of the United States, residing at Minneapolis, in the county of Hennepin and State of Minnesota, have invented a new and useful Improvement in Dress Charts or Rules, of which the following is a specification.

The object of the invention is to produce a pattern-chart for drafting patterns of ladies' and children's garments by which the drafting can be done perfectly and with economy of time and labor, and the invention consists in the construction hereinafter described and then specified in the claims.

In the drawings, Figure 1 is a plan view of the chart having on one side tables for the waist, bust and shoulder measure and also dart table. Fig. 2 is a plan view of the opposite side having thereon the front-neck and front arm-scye tables.

In the drawings, A designates the chart which in the illustration represents a length of eighteen inches by a width of three inches. Its straight edge is graduated into inches and fractions of inches from one to eighteen. Along this edge is a table of "waist measure" so marked, and divided into sixths from the first to the sixth inch division, said sixth divisions running from eighteen to forty inches as indicated in Fig. 1 of the drawings. Along the straight edge is also a "bust measure" so marked and extending from the sixth inch division to a point between the twelfth and thirteenth division and subdivided into quarter inch subdivisions running from twenty four to fifty as indicated in Fig. 1. There is also on the same face of the chart a dart table so marked and consisting of the numerals 6 to 12 inclusive arranged one below the other, and at an opposite point to these numerals are numerals beginning with ¼ and increasing in a quarter ratio until 2 is reached opposite the numeral 12 as indicated in Fig. 1. In use of this dart table to find width of dart, subtract the waist measure from the bust measure and then find the difference in the left hand column and dart in right hand column opposite.

In the chart A is formed a curved slot B C, the wall D of which is marked "shoulder" and formed with a scale indicating inches marked from 3 to 7. The wall D of the curved slot is for drafting the darts and the opposite wall marked E is for drafting the sleeve.

The edge of the chart opposite the straight scale edge is curved outwardly from F to G and is to draft the back seam, while from G to H the edge is made to describe a reverse curve as shown. The curved portion from G to H is for drafting the neck. In the use of the curves F G H, the start should be made at H.

On the obverse face of the chart shown in Fig. 2, an eighteen inch scale is indicated along the straight edge of the chart, and at one end along the short edge is a scale for taking the front neck measure only, said scale being marked "neck" and subdivided into quarter inches and bearing the numerals 13 to 16 between the two and three inch marks thereon as shown. Along the straight edge scale between the divisions 3 and 4 is another neck measure scale marked "neck" and numbered from 12 to 16 as shown.

Along the curved edge of the chart from H to or about the point G is a scale for measuring the front arm-scye, said scale being of inch divisions and each inch division subdivided into three quarter inch subdivisions as shown, the scale beginning with 10 and stopping with 20.

The outwardly curved edge opposite to the front arm-scye is used for the back arm-scye as marked.

In using the chart for drafting a lady's or child's garment, the measure of the different parts of the body for the various portions of the garment is taken with a tape line, and then the dress chart used for marking on the goods or pattern paper the lines for the various portions of the garment, the scale on each part being employed to indicate the length of the different lines, as ascertained by the tape line, and the curved portions giving the curves for the curved lines of the different parts of the body. A person skilled in the art can with a little practice become so familiar with the use and manipulation of the chart, that a great saving will result from its use and a better fit and greater accuracy secured.

I claim—

1. The within dress chart having one edge straight and provided with a graduated scale, the opposite edge being curved outwardly from one end along a portion of its length and throughout the remainder of its length curved inwardly substantially as shown, a curved slot B C formed in the body of the chart, the scale along the straight edge being divided into sub divisions for waist measure and bust measure, the curved slot being formed with a shoulder scale along one edge, a dart table on the same face, and the obverse face being provided with neck measure scales, a front arm scye measure, and a back arm scye edge, substantially as and for the purposes described.

2. The within dress chart having one end straight, the opposite end curved, a longitudinally extending straight edge between the two ends, the longitudinally extending edge opposite the straight edge being curved outwardly from one end along a portion of its length and throughout the remainder of its length curved inwardly substantially as shown, the longitudinally extending curved slot B C formed in the body of the chart, and appropriate measuring scales inscribed upon the chart, substantially as and for the purposes described.

In testimony that I claim the foregoing as my own invention I have hereto affixed my signature in presence of two witnesses.

WILLIAM J. MARSHALL.

Witnesses:
  M. DORIAN,
  W. O. CROSBY.